MEMORY PULSE PROGRAM

Filed Aug. 17, 1965

INVENTOR
FRED E. SAKALAY

BY Carl C. Kling
ATTORNEY

United States Patent Office 3,436,744

Patented Apr. 1, 1969

3,436,744

MEMORY PULSE PROGRAM

Fred E. Sakalay, Poughkeepsie, N.Y., assignor to International Business Machines Corporation, Armonk, N.Y., a corporation of New York Filed Aug. 17, 1965, Ser. No. 480,380
Int. Cl. G11b *5/00*
U.S. Cl. 340—174 5 Claims

ABSTRACT OF THE DISCLOSURE

The invention provides a pulse program for a magnetic memory in which the time required for a sense amplifier to recover from the noise associated with a preceding write operation in preparation for a read operation is reduced by extending the bit current of the write operation into the time for the following read operation so that the transient associated with turning off the bit current occurs only after the sensing operation.

CHARACTERISTICS OF THE INVENTION

*Sense amplifier recovery*

Sense amplifier recovery is one of the basic limiters of memory cycle speeds. The relatively great electrical signals required to write data into the memory, no matter how terminated and balanced, saturate sense amplifiers which are designed to operate with relatively tiny output signals. Accordingly, the sense amplifiers are differentially connected with balanced inputs, and operate with transients rather than with signal levels which are balanced out. As far as the sense amplifier is concerned, the rise transient of the drive current pulse is little different from the fall transient, and the drive signal level is no different from the no-drive signal level. This is especially true in orthogonal mode memories of the type having common bit-sense systems, where the sense conductor is also used to carry the bit current drive signal, and where output signals are relatively small.

The sense amplifier in such memory systems is directly connected to the source of bit drive signal currents during the write half cycle. So long as this bit current is coupled in balanced fashion, its effect on the sense amplifier is zero. The sense amplifier operation is the same whether bit current is flowing or not, so long as the bit current presents equal voltages to the differential inputs. It is possible to sense certain storage elements while bit current is flowing. This invention takes advantage of the possibility.

*Environment*

The invention operates in the environment of an orthogonal mode magnetic storage system of a type which can perform a readout operation during the flow of bit current. Examples of such orthogonal mode systems are anisotropic magnetic films, chain store and certain multiple aperture ferrite devices. In orthogonal mode magnetic storage systems, data is stored in the form of differing states of semi-permanent magnetic remanence in individual magnetic bit storage elements. The individual magnetic bit storage elements each have an easy axis of magnetization due to gross shape or crystalline anisotropy and are stable in each of two directions along the easy axis.

These two directions may be assigned respectively the 0 and 1 binary values. In certain types of orthogonal mode systems one of the easy axis directions may be assigned the 0 binary value and any other condition of magnetic remanence be assigned the 1 value. The basic requirement is that there be a reference data state, normally assigned the 0 value, and a detectably different data state, normally assigned the 1 value.

Matrix operation normally requires that the bit storage element be arranged in columns and rows with the individual bit storage locations occurring at the intersection of column and row conductors. The individual bit storage element responds to magnetic fields generated by electric current passing through their windings. Each bit storage element in the matrix remains at its given value unless provided with magnetic drive greater than the switching threshold. The element remains in one or the other of the easy axis directions or unless supplied with a threshold lowing magnetic field at right angles to the easy axis, which leaves the bit storage element in an indeterminate state. From the indeterminate state, it orients at random in one or the other of the easy axis directions, unless controlled by a bit field. The bit field controls the final orientation in the easy axis 1 or 0 directions as required.

The data state of the individual bit storage element is determined by supplying the bit storage element with a magnetic drive at right angles to the easy axis and monitoring the type of magnetic excursion occurring as a result. In the usual case, the magnetic excursion will differ in polarity as a function of its remanent condition 1 or 0. The readout pulse also serves to lower the threshold so that the magnetic bit storage element can be driven to the desired data value by a relatively low magnetic field in the easy access direction toward the desired data state either 1 or 0. In the normal matrix arrangement, the threshold lowering hard direction field is supplied to the entire group of cores being referenced. The threshold lowering field thus does not affect any of the cores except those selected. The bit pulse, however, is applied at right angles in such fashion that its magnetic field is applied to each of the many bit storage elements which are similarly positioned in their respective word locations. The bit field, however, is below the switching threshold of any bit storage elements not provided with the threshold lowering pulse.

A memory cycle normally includes a readout operation, to determine the data value of the word stored, followed by a write operation. If the data word readout is desired to be retained the identical data is regenerated and the cycle is called a fetch cycle. If a new data word is to be placed in the word location, the new data is set into the magnetic bit storage elements and the cycle is called a store cycle.

The individual magnetic bit storage elements respond to magnetic drive generated by electric currents passing through their associated windings. Each bit storage element in the matrix remains at its given value unless provided with magnetic drive from each of its two associated windings.

The orthongal mode matrix is normally arranged as a rectangular array of magnetic bit storage elements in rows and columns traversed by word conductors in the column dimension and bit conductors in the row dimension. Energization of a selected word conductor provides full read energization to each of the associated bit storage elements making up the word.

The common characteristic of the orthogonal mode storage devices is their readout operation based only on the threshold lowering (normally hard axis) field pulse, in which the presence or absence of a concurrent bit field pulse is immaterial to the readout. This invention takes advantage of this relationship.

*Objects*

An object of the invention is to speed up the memory cycle time of an orthogonal mode memory by extending bit current, beyond the time required for writing, into the read portion of the next cycle, so delays for sense amplifier recovery are not required between cycles.

Another object of the invention is to simplify the pulse program of an orthogonal mode memory.

*Features*

A feature of the invention is a balanced differential connection, in an orthogonal mode memory, of a common bit sense conductor to the sense amplifier for use with a pulse program in which the bit current extends into read time beyond the sensing time.

*Advantage*

An advantage of the invention is its faster cycle time for an orthogonal mode memory, derived from the elimination of the need for sense amplifier recovery from the fall transient of the bit drive pulse between write time and the following read time.

Other objects, features and advantages of the invention will be apparent from the following more particular description of a preferred embodiment of the invention, as illustrated in the accompanying drawings.

*Figures*

SUMMARY OF THE INVENTION

Figure 1:
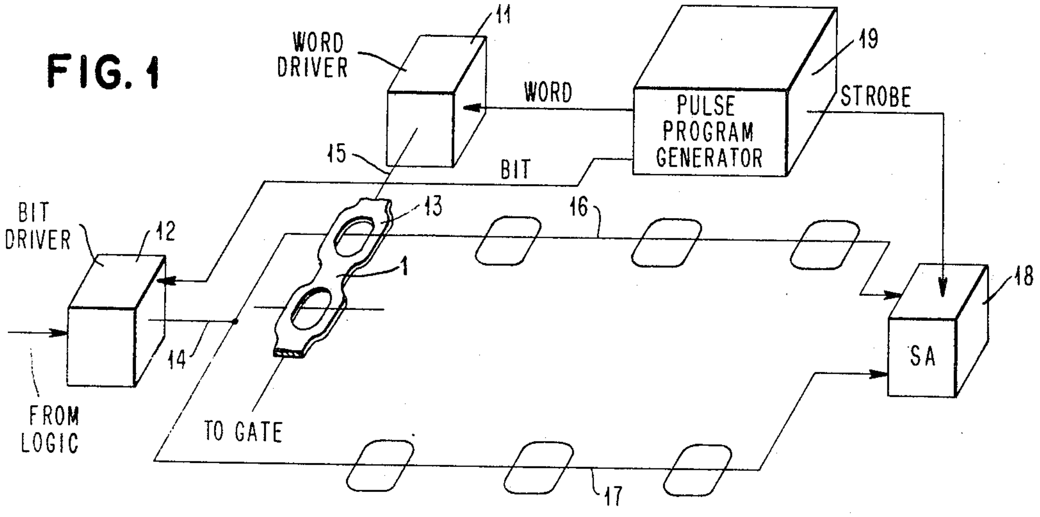
FIGURE 1 is a semi-diagrammatic sketch of the invention.

The invention is a pulse program for increasing the speed of memory cycle operation by basing sense amplifier recovery time upon the rise transient of bit current rather than the fall transient. Bit current from the write portion of the previous cycle is extended at a constant level during the read portion of the succeeding cycle.

The write portion of the pulse includes timing for word driver 11 and bit driver 12 for selected ones of the bit storage elements, such as element 13, which are set to the data value determined by bit current. The read half cycle for the next memory reference, which immediately follows the write half cycle, involves a strong magnetic drive in the read direction by word driver 11. This drives bit storage element 13 to the hard direction, providing an output which is applied differentially along wires 16 and 17 and is recognized by sense amplifier 18. Sense amplifier 18, even though bit current is flowing, is unsaturated because the bit current is rejected differentially and because sufficient time has passed since the rise transient of the bit current. Because the sense amplifier is unsaturated, the read cycle can directly follow the previous write cycle, without delay.

DETAILS OF THE INVENTION—FIGURES 1 AND 2

The invention is a pulse program for speeding the memory cycle by extending bit current into the read portion of the cycle, thus basing sense amplifier recovery time from the rise of bit current rather than the fall.

*Structure*

FIGURE 1 illustrates an orthogonal mode memory of the chain type for operating according to the invention. Word driver 11 and bit driver 12 perform the read-write selection of a bit storage element 13 by providing selection currents to conductors 14 and 15. Common bit sense conductors 16 and 17 couple to sense amplifier 18 differentially for common mode noise rejection and differential mode signal amplification. Pulse program generator 19 provides the required timings which are to be diagrammed in FIGURE 2.

The balanced connection of bit driver 12 to a pair of sense conductors 16–17, only one of which sense connectors is used in any memory reference, permits the use of the bit conductor for sensing. Bit drive pulses are connected differentially to the sense amplifiers where they cancel each other, without causing more than temporary saturation of the sense amplifier.

The bit storage elements, such as bit storage element 13, are the areas of thin magnetic material, such as nonmagnetostrictive nickel iron, about apertures in a plated elongated conductive strip 1. Each aperture is threaded by a bit sense conductor such as conductor 16. Conductive strip 15 is itself the word conductor.

Read selection is accomplished by a drive pulse on a word conductor such as conductor 15. Write selection is accomplished by selective bit drive pulses on bit conductors such as 16, overlapping the terminal portion of the word drive pulse on a word conductor such as conductor 15. Each memory cycle includes a read time followed by write time. The read operation drives all the bit storage elements to an indeterminate state and senses the magnetic excursions which occur as a result of this driving. Any bit storage element at the 1 state, when driven to the indeterminate state, experiences a magnetic excursion and provides an output signal of the polarity which defines the 1 bit. The output signal travels along sense conductor 16–17 to sense amplifier 18. Bit storage elements at the 0 state experience a magnetic excursion in the opposite direction from that experienced by bit storage elements at the 1 state, and provide output signals of opposite polarity.

The write half-cycle immediately follows the read half-cycle. The word has already been selected by the word driver. The continuing pulse of read current provides a transverse magnetic field which holds all bit storage elements on the selected chain in the indeterminate state as the read half-cycle ends. Individual bits within the word are selected by bit drivers, which selectively provide the bit current for urging the bit storage elements toward 1 or 0. The bit conductor serves also as the sense conductor in order to maintain the number of drive windings at the minimum. The bit drive current is divided across bit sense conductors, for example, conductors 16 and 17. It is applied to sense amplifier 18 differentially, thus cancelling, having little effect on the sense amplifier when flowing at a level. Minute differences in the rise and fall transients of the bit drive current, however, may drive to saturation sense amplifier 18, which is designed to work with the very small sense output signals.

The next read cycle cannot follow the write cycle so closely that sense amplifier 18 cannot recover prior to sensing time, unless special precautions are taken.

According to the invention, the bit drive current is extended beyond write time, into the read half-cycle of the succeeding cycle, in order to base sense amplifier recovery upon the rise transient rather than the fall transient. The sense amplifier stabilizes on the extended bit current, which is a signal level and because of the balanced nature of the application to the sense amplifier, appears as a null signal. The output signal being a transient above the null signal, applied via conductor 16 to only one of the differential inputs, sensc amplifier 18 can identify the 1 and 0 signal.

*Timing*

Figure 2:
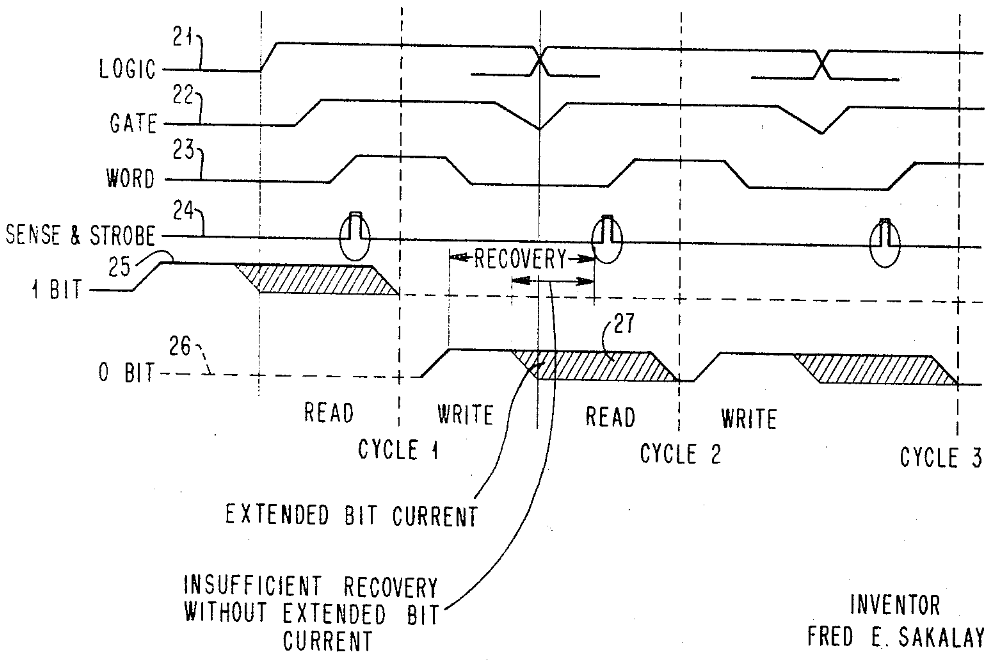
FIGURE 2 is a timing diagram illustrating the pulse program of the invention.

FIGURE 2 shows three consecutive memory cycles. Each cycle includes a read half cycle and a write half cycle, normally directed to the same word location of cores.

*Cycle 1.*—Logic defining cycle 1 defines the storage cycle. This logic may include means for specifying the address, and means for processing of data fetched from or stored in the memory. Line 21 shows logic timing.

Gate timing pulses 22 from pulse program generator 19 provide gates (not shown) with capability of passing drive current from the selected driver along the selected word conductor.

Word timing pulses 23 from pulse program generator 19 perform read selection by conditioning word drivers such as 11 to provide currents which generate transverse fields on the selected chain. The effect of the transverse fields is to cause magnetic excursions from the respective data states to the indeterminate state, inducing output pulses of polarity related to data value.

Strobe pulses 24 are timed to coincide with maximum signal strength of the dense output pulses. The strobe pulses are used to gate sense amplifier outputs, in a standard manner not shown.

Bit timing pulse 25, for the previous cycle (cycle 0) which defined a 1 state, controls bit drivers such as bit driver 12 to provide properly polarized 1 bit drive currents for setting the various bit storage elements which are to be set to 1.

The portions of the bit timing pulse required for the writing function in cycle 0 is shown in white, the portions of the bit timing pulses used to control extended bit current is shown shaded.

Sense output occurs and is strobed by strobe pulse 24 during the extended bit current of 1 bit 26 from cycle 0. The bit current timing ends prior to the end of the read half-cycle, to permit writing during cycle 1. Cycle 1 defines a 0 bit, pulse 26, which overlaps the terminal portion of the word pulse 23.

The rise transient of bit pulse 26 saturates sense amplifier 18, at least temporarily, but sense amplifier 18 stabilizes as the bit current levels off. Extended bit current 27 permits recovery based on the rise transient, so that the read half-cycle of cycle 2 can follow immediately.

Recovery time is from the rise of bit current timing to the output sense time. Had the bit current not been extended as shown by the shaded portions of the timing pulses, insufficient recovery time would have been available.

*Cycle 2.*—Cycle 2 is identical in all respects with cycle 1. Bit current is extended into the read half-cycle of cycle 3, permitting sense amplifier recovery during the extension.

*Cycle 3.*—Cycle 3 includes a reading function, which occurs during the extension of bit current from cycle 2.

BACKGROUND INFORMATION

The chain memory is described in copending, commonly assigned United States patent applications including the following:

(A) Application of J. C. Sagnis, Jr., M. Teig and R. L. Ward, "Non-Destructive Readout Magnetic Memory," Ser. No. 224,415, filed Sept. 18, 1962.

(B) Application of J. C. Sagnis, Jr., and P. E. Stuckert "Magnetic Strip Memory," Ser. No. 255,479, filed Feb. 1, 1963.

Other orthogonal mode memories, including magnetic film devices of several forms and multiaperture ferrite devices, are described in various texts including the following:

Meyerhoff et al., Digital Applications of Magnetic Devices, Wiley and Sons, Library of Congress, card 60–14246, chapters 26 and 31, especially pages 428–443 and 537–559.

Suitable word drivers, bit drivers, strobe techniques, and a suitable structure for a pulse program generator clock, are described in various publications including the following:

IBM Customer Engineer Instruction-Maintenance, IBM 7040 Data Processing System, 7106 Core Storage Operations, form 223–2593–1, copyrighted 1964, especially pages 15–17 and 45–55.

CONCLUDING SUMMARY

The invention is a pulse program for speeding the memory cycle by extending bit current into the read half cycle so as to base sense amplifier recovery upon the rise transient of the sense amplifier rather than the fall transient. The actual sensing occurs during the read portion of a given memory cycle during the extended bit current from the write portion of the previous cycle. The extended bit current, since it affects the sense amplifier in balanced common mode, has no adverse effect on the sensing. The bit current fall transient has minimal adverse effect since it occurs during the interval after the output signal has been strobed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic memory having a matrix of orthogonal mode storage elements arrayed in rows and columns, word conductor means traversing the columns of cores, bit sense conductor means traversing the rows of cores, word driver means for energizing a selected column conductor, bit driver means for energizing a selected pair of bit sense conductors, and sense amplifier means coupled to said pair of bit sense conductors for common mode noise rejection, characterized by a pulse program generator which defines for each memory cycle a read half-cycle and a write half-cycle, said pulse program generator for the write half-cycle including means for controlling energization of said word drive means in a fashion to provide a threshold lowering word current to a column of cores, and means for controlling said bit drive means to provide bit current to selected rows of cores in such fashion that selected individual ones of the cores in said column of cores are switched to selected data value states; and said pulse program generator for the read half-cycle including means for controlling energization of said word drive means in a fashion to provide a read excitation to a column of cores, and means controlling said bit drive means for providing an extended bit current from the previous write half-cycle at a signal level, whereby sensing occurs during the duration of the extended bit current so that sense amplifier recovery prior to sensing is based upon saturation effects of the rise transient of bit current, rather than the fall transient.

2. A magnetic memory according to claim 1, wherein the orthogonal mode storage elements are apertured strips of magnetically coated conductive material, said word conductor means are the strips themselves, and said bit sense conductor means pass through the apertures of said strips.

3. A magnetic memory according to claim 1, wherein the orthogonal mode storage elements are anisotropic magnetic films.

4. A magnetic memory according to claim 1, wherein the orthogonal mode storage elements are multiaperture ferrite devices.

5. A memory having an array of magnetic storage elements coupled to word wires defining words of the memory and to bit wires defining bit positions within the words of the memory, means for energizing a selected word wire for a read operation independent of energization of the bit wires followed by a write operation in cooperation with energization of said bit wires, storage element signal sensing means for each bit position operable at a predetermined time during a read operation wherein the improvement comprises, bit drivers for each bit position for selectively energizing said bit wires with a current of a predetermined polarity and amplitude to perform a write operation in cooperation with a word current and to not prevent a read operation, and means timing said bit drivers to terminate said bit wire current at a time corresponding to the completion of a next occurring operation of said sensing means, whereby the noise associated with terminating said bit current occurs after a sensing operation.

References Cited

UNITED STATES PATENTS

| | | | |
|---|---|---|---|
| 3,096,510 | 7/1963 | Lee | 340—174 |
| 3,283,313 | 11/1966 | Hathaway | 340—174 |
| 3,360,786 | 12/1967 | Steele et al. | 340—174 |

STANLEY M. URYNOWICZ, Jr., *Primary Examiner.*